United States Patent [19]
Noble et al.

[11] Patent Number: 5,634,053
[45] Date of Patent: May 27, 1997

[54] FEDERATED INFORMATION MANAGEMENT (FIM) SYSTEM AND METHOD FOR PROVIDING DATA SITE FILTERING AND TRANSLATION FOR HETEROGENEOUS DATABASES

[75] Inventors: William B. Noble, Santa Monica; Bhadra K. Patel, Anaheim; Jenny K. Wang, Cerritos, all of Calif.

[73] Assignee: Hughes Aircraft Company, Los Angeles, Calif.

[21] Appl. No.: 521,340

[22] Filed: Aug. 29, 1995

[51] Int. Cl.$^6$ .............................. G06F 17/30; G06F 15/16
[52] U.S. Cl. ........................................ 395/604; 395/610
[58] Field of Search .................................. 395/600, 604, 395/610

[56] References Cited

U.S. PATENT DOCUMENTS

| | | | |
|---|---|---|---|
| 4,714,995 | 12/1987 | Materna et al. | 364/200 |
| 5,375,235 | 12/1994 | Berry et al. | 395/600 |
| 5,412,806 | 5/1995 | Du et al. | 395/600 |

OTHER PUBLICATIONS

Jae et al. "Object Query Diagram": An Extended pp. 1049-2615 1993 IEEE.
Anselm Spoerri "Visual Tools for Information Retrieval" pp. 1049-2615 1993 IEEE.

*Primary Examiner*—Thomas G. Black
*Assistant Examiner*—Jean M. Corrielus
*Attorney, Agent, or Firm*—G. S. Grunebach; M. W. Sales; W. K. Denson-Low

[57] ABSTRACT

A FIM system integrates data from a plurality of interconnected local databases to provide users with access to a virtual database. The FIM includes a user interface for generating a global query to search the virtual database, a smart dictionary database (SDD) that contains configuration data, a data information manager (DIM) that decomposes the global query into local queries, and a plurality of local information managers (LIMs) that execute the local queries to search for and retrieve data from the enumerated databases. A filter generates a list of those local databases that contain information relevant to the global query. As a result, the DIM only generates local queries for the enumerated local databases. An input translator converts the global query into the respective local formats for the local databases so that the FIM provides true integration of heterogeneous databases. An output translator converts the data retrieved from each local database into a uniform i/o format so that the data presented to the user is integrated. The user typically selects the i/o format as his or her local format or a global format associated with the virtual database.

16 Claims, 9 Drawing Sheets

FEDERATED INFORMATION MANAGEMENT (FIM) SYSTEM AND METHOD FOR PROVIDING DATA SITE FILTERING AND TRANSLATION FOR HETEROGENEOUS DATABASES

CROSS-REFERENCE TO RELATED APPLICATIONS

The present application is related to a co-pending commonly assigned U.S. patent application Ser. No. 08/064,690 filed on May 20, 1993, entitled "Federated Information Management Architecture and System" by Son K. Dao and Nader Ebeid, now U.S. Pat. No. 5,596,744.

BACKGROUND OF THE INVENTION

1. Field of the Invention

The present invention generally relates to DataBase Management Systems (DBMS) dispersed over a long haul network, and more specifically to a federated (global) DataBase controller that provides a user access to a virtual database by integrating heterogeneous DBMSs (data sites) dispersed over a long haul network.

2. Description of the Related Art

Large scale information and DataBase Management Systems have been developed independently and without consideration that one day they may need to be integrated. DBMSs exist in fields such as earth science, computer integrated manufacturing and medicine. As a result, the systems have become more and more complex, are often incompatible and are characterized by several types of heterogeneity.

Many different DataBase Management Systems (DBMS) models may be used to represent data, such as the hierarchical, network, and relational models. Aside from databases, many software systems (such as spreadsheets, multi-media databases and knowledge bases) store other types of data, each with its own data model. Furthermore, the same data may be seen by various users at different levels of abstraction.

In addition, the exact same data may be represented by as many different names and/or values as there are databases. For example, a patient in different medical databases may be represented by his or her name, social security number, drivers license number or a personal ID number. Furthermore, the patient's height may be represented in inches, feet, centimeters or meters.

Because of such differences, users find it difficult to integrate and understand the meaning of all the types of data presented to them. Analysts, operators and current data processing technology are not able to organize, process and intelligently analyze these diverse and massive quantities of information. In order to access data, users may have to learn different operating and word processing systems. This increases training costs and reduces efficiency, which often results in late reports to decision makers, missed intelligence opportunities and unexploited data.

Another related issue is the efficiency or rather inefficiency of searching each database for a piece of information. For example, a network of medical databases may interconnect over a hundred different databases of which any one patient may be included in only two or three. As the number, size and complexity of databases grows, the inefficiency of searching each database has become a significant problem.

Past and current research and development in distributed databases allows integrated access by providing a homogenizing layer on top of the underlying information systems (UISs). Common approaches for supporting this layer focus on defining a single uniform database language and data model that can accommodate all features of the UISS. The two main approaches are known as view integration and multi-database language.

The view integration approach advocates the use of a relational, an object-oriented (OO), or a logic model both for defining views (virtual or snapshot) on the schemas of more than one target database and for formulating queries against the views. The view integration approach is one mechanism for homogenizing the schema incompatibilities of the UISs. In this framework, all UISs are converted to the equivalent schemas in the standard relational, OO, or logical data model. The choice of the uniform data model is based on its expressiveness, its representation power and its supported environment. This technique is very powerful from the user's point of view. It insulates the user from the design and changes of the underlying Information Management System (IMS) Thus, it allows the user to spend more time in an application environment. However, the view integration approach has a limited applicability (low degree of heterogeneity) because there are many situations when the semantics of the data are deeply dependent on the way in which the applications manipulate it, and are only partially expressed by the schema. Many recent applications in areas where traditional DBMSs are not usable fall into this situation (multi-media applications involving Text, Graphics and Images are typical examples), in addition, there are no available tools to semi-automate the building and the maintenance of the unified view which is vital to the success of this technique.

In the multi-database language approach, a user, or application, must understand the contents of each UIS in order to access the shared information and to resolve conflicts of facts in a manner particular to each application. There is no global schema to provide advice about the meta-data. Ease of maintenance and ability to deal with inconsistent databases make this approach very attractive. The major drawback of this approach is that the burden of understanding the underlying IMSs lies on the user. Accordingly, there is a tradeoff between this multi-database language approach and the view integration approach discussed above.

Chin-Wan Chung, "Design and Implementation of a Heterogeneous Distributed Database Management System," Proceeding of the IEEE Computer and Communications Societies, pp. 356–362, 1989 discloses a software program called DATAPLEX. DATAPLEX translates an SQL query into various other query formats so that it can query non-relational data base systems. Marjorie Templeton et al., "Mermaid-A Front-End to Distributed Heterogeneous Databases," Proceeding of the IEEE, Vol. 75, No. 5, May 1987, pp. 695–707 discloses a program called "Mermaid" that allows the user of multiple databases stored under various relational DBMSs running on different machines to manipulate the data using a common language.

There remains an urgent need to integrate these dispersed heterogeneous databases to provide uniform access to the data, to maintain integrity of the data, to control its access and use, and to improve search efficiency. Rather than requiring users to learn a variety of interfaces in order to access different databases, it is preferable that a single interface be made available which provides access to each of the DBMSs and supports queries which reference data managed by more than one information system. The single interface should provide true integration of the heterogenous databases so that the user can easily access and analyze data that is not represented uniformly across the databases. The interface should also restrict the search to only databases that potentially contain the data of interest to improve efficiency.

SUMMARY OF THE INVENTION

The present invention seeks to provide a Federated Information Management (FIM) system and method for efficiently and truly integrating data from a plurality of interconnected and heterogeneous local databases to provide users with access to a virtual database.

This is accomplished with a FIM architecture that includes a user interface for generating a global query to search the virtual database and for selecting an i/o format, a smart data dictionary (SDD) that contains configuration data for each of the local databases and the virtual data base, a data information manager (DIM) that decomposes the global query into multiple local queries, and a plurality of local information managers (LIMs) that execute the local queries to search for and retrieve data from the local databases.

To improve search efficiency, a filter generates a list of those local databases that contain information relevant to the global query. As a result, the DIM only generates local queries for the enumerated local databases. In practice, only a small percentage of the databases in a network will contain data for a particular global query. Thus, the filter substantially increases search efficiency and reduces the chance that the system will hang up.

To increase the completeness of the search, an input translator is provided which translates the global query into the respective local formats for the local databases. As a result, the local queries will find and retrieve all of the relevant data requested by the user, not just the data that is represented in the exact same format as the global query. Thus, the input translator provides true integration of heterogeneous databases.

To improve user friendliness and to facilitate analysis of the data, an output translator converts the data retrieved from each local database into the uniform i/o format. The user typically selects the i/o format as his or her local format or a global format associated with the virtual database. Alternately, the user could select a different local format or potentially a mixed format.

For a better understanding of the invention, and to show how the same may be carried into effect, reference will now be made, by way of example, to the accompanying drawings in which:

DESCRIPTION OF THE PREFERRED EMBODIMENT

The present invention allows multiple users to access through a global query geographically dispersed and heterogeneous information management systems or Relational DataBase Management Systems (RDBMS). It provides each user with a unified view of the underlying information management systems so that they appear to be a single (virtual) database. The invention includes a Federated Information Management (FIM) architecture coupled with the Inter-Site Transaction Service (ISTS) architecture to allow transparent access to a wide variety of DBMSs while maintaining the local autonomy of the underlying DBMSs. This means that the users can still use the same application to access the local databases, and only minimum change to the local database system is required for sharing and remote accessing relevant data. With this invention architecture, the FIM of the present invention can run on top of different hardware, operating systems, communication networks, and DBMSs. The federated architecture of the present invention is not limited to integrate relational DBMSs, but may also integrate legacy DBMSs such as hierarchical or network DBMSs, spatial information systems or geographical Information Systems, and text retrieval systems.

One novel aspect of the invention is the input translation of the data fields in the user's global query into the local and heterogeneous formats associated with each of the local databases. This allows the users to access all information that is related to a particular data field without missing information because the data field in a particular local database is represented in a different format.

A second novel aspect is the filtration of the local databases to identify only those databases that actually contain data related to the particular value of the data field selected by the user. This substantially improves the operating efficiency of the virtual database because, in practice, only a small percentage of all the local databases in the network will contain relevant information for a particular data field. Furthermore, reducing the number of local queries that must be executed greatly reduces the probability of an error that would hang up the system.

Another novel aspect of the invention is the output translation of the data retrieved from each of the local databases into a uniform format. The uniform format is typically the user's local format or a global format for the virtual database itself. This allows the retrieved data to be integrated or merged to present the requesting user with an integrated response. Thus, the data presented to the user appears to come from a single uniform (virtual) database.

An additional aspect is that the requesting user can select to generate the global query and receive the integrated response in either the user's local format or in the global format. This allows the user to access the virtual database and analyze the data in the language or format with which the user is most familiar.

Figure 1:
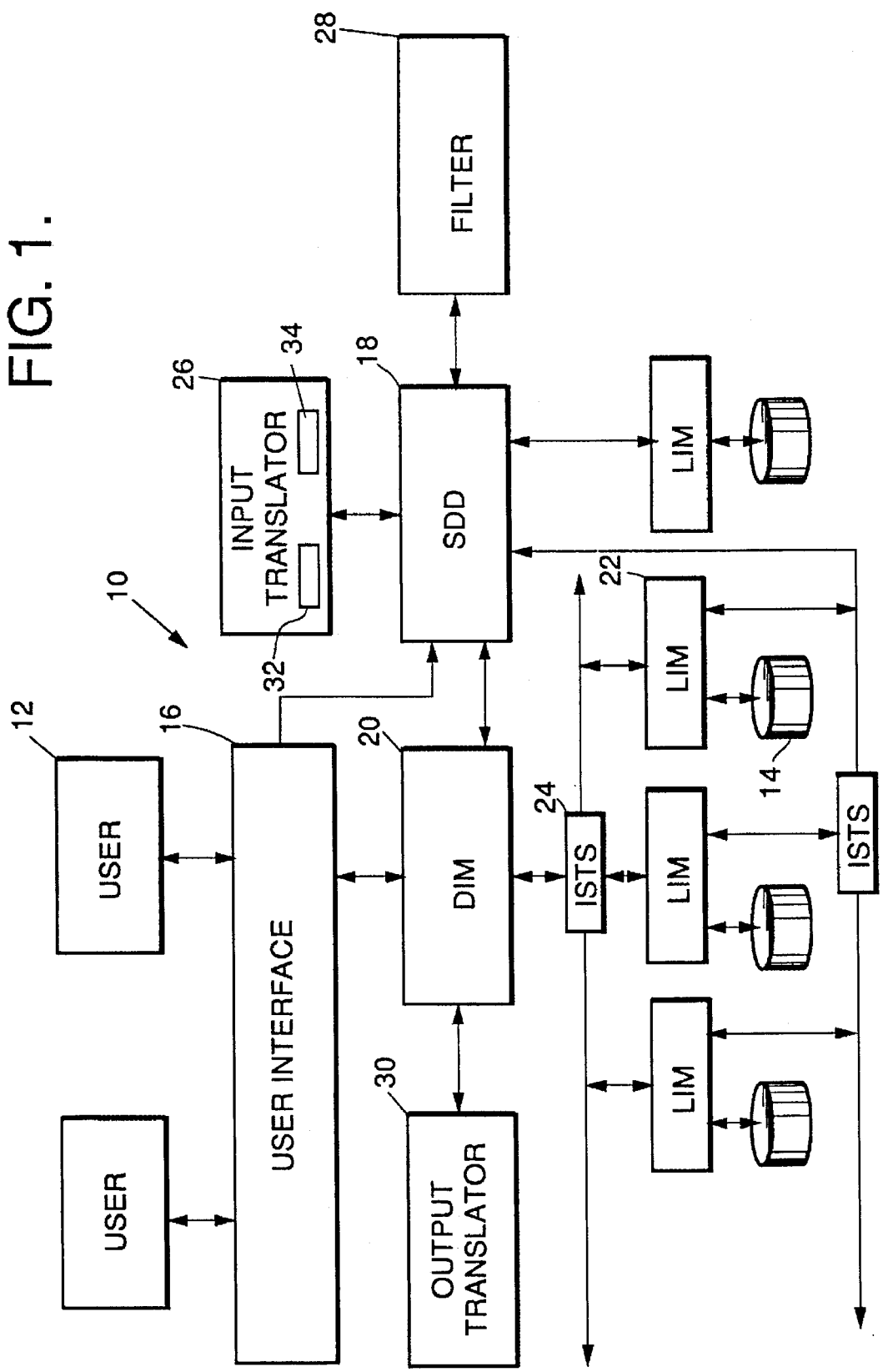
FIG. 1 is a diagram illustrating one mode of a data communication network between individual users or applications and underlying information systems in accordance with the present invention.

As shown in FIG. 1, a Federated Information Management System (FIMS) architecture 10 is employed to present multiple users 12 with the illusion of a single, integrated, non-distributed (virtual) database which accesses data from multiple heterogeneous Relational DataBase Management Systems (RDBMS) 14 through a uniform user interface 16. As discussed previously, the individual RDBMSs in a large network use many different architectures, data formats and user interfaces. Each of the RDBMSs contain multiple data tables in which the data, referred to herein as data fields, are organized into records. A user can access a particular record or sets of records by specifying one of the data fields in the global query. As a result of the heterogeneous architectures, the names and format for the tables and fields, although associated with the same data field, can be very different. Similarly, the virtual database contains global names and formats for the tables and data fields, which may or may not correspond to any of the local names and formats.

For example, in a medical network the individual heterogeneous RDBMS may be located in remote doctors' offices, hospitals, pharmacies and insurance companies. Medical data can be divided into tables such as medications, treatments and surgical procedures. The table that represents medications may be referred to as med_table, medical_table or any number of other descriptive names in the various RDBMSs. The records in the medication table include data fields for the patient, drug, date, amount, the prescribing doctor and ailment. The data field that identifies the patient may be represented as the patient's name, drivers license, social security number, an insurance number or a local ID number. In the virtual database, the medication table may be represented as MED_TABLE and the patient ID by the patients name; last name first and first name last (Smith, John). For example, a portion of the requesting user's RDBMS, number 34, may appear as:

| Med_Table | | | | |
|---|---|---|---|---|
| ID | | | | |
| BlueShield.123 | | | | |
| | aspirin | Jan. 1 1985 | 500 mg | Dr. Adams |
| | demurol | March 5 1987 | 250 mg | Dr. Brown | and a portion of another RDMBS, number 8, may appear as:

| medical_table | | | | |
|---|---|---|---|---|
| SS# | | | | |
| 617-22-837 | | | | |
| | codeine | 6-3-91 | 800 mg | Dr. Bob |
| | tylenol | 8-19-93 | 500 mg | Dr. Tom |

The user interface 16 includes a Query Browser and Editor (QuBE) module that provides the users 12 with a uniform access to the multiple RDBMSs 14. Users can formulate their global queries using either a structured query language (SQL) or a graphical user interface (GUI). The requesting user selects an i/o format for constructing the global query and for receiving the integrated response. The user preferably selects either the user's local format or the global format. Alternately, the user may select any of the other local formats or a mixed format.

The following is an example of a global query generated in SQL:

Select ID, Medications From Med_Table Where ID=BlueShield.123 where the Select command identifies the desired data fields, the From command identifies the table of interest, and the Where command assigns the data field a particular value for searching the databases. The above global query would retrieve all of the medication from the Med_Table associated with the particular ID value BlueShield.123.

The FIM architecture 10 includes a Smart Data Dictionary (SDD) server 18 that contains meta-data information for each of the RDBMSs 14 and the virtual database such as: schema; data distribution; sites configuration including data field formats; domain knowledge; and, inter-site relationships. The SDD automatically maintains data consistency as new applications or databases are added. To support reasoning and problem solving capabilities in a cohesive way, the SDD uses a Multi-dimensional reference model that allows multiple integrated layers of abstractions spanning a wide variety of data types (text, spatial, etc.).

A Distributed Information Manager (DIM) 20 accesses the meta-data stored in SDD 18 to decompose the global query into multiple local queries. The DIM also provides a distributed access plan (DAP) for executing the global query. This access plan is composed of local execution plans (LEPs), one for each RDBMS. Each LEP includes the local query and control information.

The DIM 20 includes a Syntactic and Semantic Parser (SSP) that parses and validates the syntax of the global query. An optimizer provides planning to control the time that is required to access the RDBMSs and process the global query. An execution plan generator (EPG) translates the LEPs from an internal data structure to the Distributed Intermediate Structured Query Language (DISQL). A distributed processing coordinator (DPC) coordinates the execution of the local queries.

A plurality of local information managers (LIMs) 22, one for each RDBMS, execute the local execution plans to retrieve data from the respective RDBMSs. The DIM, LIMs and RDBMSs are inter-connected via an inter-site transaction service (ISTS) 24. The LIM 22 provides a mapping from the global view associated with the virtual database to the multiple local views, translates the local queries from DISQL to the local RDBMS language, and interfaces with the local RDBMS. The LIM includes the following sub-components: a local controller, a local reduction processor, a fragment replicator, a local query processor, a result transmitter, and a results integrator. These sub-components execute the local execution plan and pass the retrieved data back to the DIM, which, in turn, combines the results and presents and integrated response to the requesting user.

The FIM architecture 10 further includes an input filter 26 and input and output translators 28 and 30 that improve its performance. Specifically, the filter and translators improve the completeness of the search for data, the efficiency of the search, and the integration of the retrieved data.

The input filter 26 provides an enumerated list of those RDBMS 14 that actually contain the data field value, translated to their local formats, prescribed in the global query. This causes the SDD 18 to only pass meta-data for the enumerated RDBMS to the DIM 20. Thus, the number of local queries and local execution plans generated by the DIM and executed by the LIMs is greatly reduced. For example, in a network of 100 medical RDBMSs an individual patient may be included in only three of them. Alternately, the input filter could be applied after the DIM generates a complete set of local queries to remove those queries not included in the list. However, this approach would be less efficient and is not preferred.

Continuing the above example, the input filter 26 itself is preferably a data base of which the portion relevant to the example could look like the following:

| MED_TABLE | | |
|---|---|---|
| PATIENT NAME | | |
| | SMITH, JOHN | 1, 8, 34, 57 |
| | SMYTH, JIM | 5, 19, 42, 84 |
| | TOWNSEND, DON | 11, 32, 54 | where MED_TABLE is the global name for the medication table, PATIENT NAME is the global name for the patient data field and the global format is last name first and first name last. The filter database includes three patients for which medical data is contained in the enumerated local data bases. The input filter locates the table, then the data field and finally the value specified in the global query.

The input translator 28 includes two components: a global translator 32 and a local translator 34. The global translator first translates the values of the data fields in the global query into the global format. This allows the input filter 26 to enumerate the relevant RDBMSs. Thereafter, local translator 28 converts the data field value and, when necessary, the name of the data field or table into the local formats for the RDBMSs enumerated by the filter 26. As a result, the SDD 18 passes the local names and values to the DIM so that it generates the local queries with the correct local names and values for searching the respective RDBMS. Thus, all of the relevant data will be retrieved and presented to the requesting user.

The input translator 28, as well as the output translator 30, include both algorithmic and non-algorithmic translators. The algorithmic translators include those for converting meters to miles or uppercase to lower case letters. Non-algorithmic translators use look-up-tables (LUTs) and include conversions from proper names to insurance codes or medical procedure names to numeric codes. Both types of translators can be implemented as a single database.

For the above example, the non-algorithmic global and local translators are preferably databases for which the portions relevant to the example have the following form:

| Global Translator: | | |
|---|---|---|
| RDBMS | Local Value | Global Value |
| 1 | med_table | MED_TABLE |
| | I.D. | PATIENT NAME |
| | 418 | SMITH, JOHN |
| 8 | medical_table | MED_TABLE |
| | SS# | PATIENT NAME |
| | 617-22-837 | SMITH, JOHN |
| 34 | Med_Table | MED_TABLE |
| | ID | PATIENT NAME |
| | BlueShield.123 | SMITH, JOHN |

| Local Translator: | | | |
|---|---|---|---|
| Global Value | RDBMS1 | RDBMS8 | RDBMS34 |
| MED_TABLE | med_table | medical_table | Med_Table |
| PATIENT NAME | I.D. | SS# | ID |
| SMITH, JOHN | 418 | 617-22-837 | BlueShield.123 |

The output translator 30 converts the data retrieved by the LIMs from their respective RDBMSs into the i/o format selected by the requesting user. The output translator 30 employs a database similar in structure to the one used by the global translator component of the input translator 28. As a result, the integrated response presented to the user represents all of the data in the same format. Completing the above example, when the user selects the global format:

| PATIENT NAME = SMITH, JOHN | | | |
|---|---|---|---|
| MED_TABLE | | | |
| aspirin | Jan. 1 1985 | 500 mg | Dr. Adams |
| demurol | March 5 1987 | 250 mg | Dr. Brown |
| codeine | June 3, 1991 | 800 mg | Dr. Bob |
| tylenol | August 19 1993 | 500 mg | Dr. Tom |

This is a much cleaner presentation that facilitates quick and accurate analysis of the retrieved data.

For typical RDBMS and for large networks of such systems, the translation and filter databases could be immense. Therefore, the data fields and the associated lists are only included for data fields such as patient ID or common medical procedures that users commonly employ to search the virtual database. Furthermore, each list is associated with a data field value represented in the global format only. Providing a separate list for each local representation of a particular data field value would inefficient.

Taken together the filter and translators a) remove all local queries that would not retrieve data, b) provide the remaining local queries with the correct local names and values associated with the requesting user's global query, and c) integrate the retrieved data into the uniform i/o format. This improves search efficiency, lowers the probability of error, and provides the users access to a virtual database that truly integrates the heterogeneous RDBMSs. A detailed description of the basic FIM architecture, not including the translators and filter, is provided in the co-pending application entitled "Federated Information Management Architecture and System" by Son K. Dao and Nader Ebeid. The portions of that application detailing the SDD 18, DIM 20 and LIMs 22 and their interactions are included herein and described below in conjunction with FIGS. 2–11.

Figure 2:
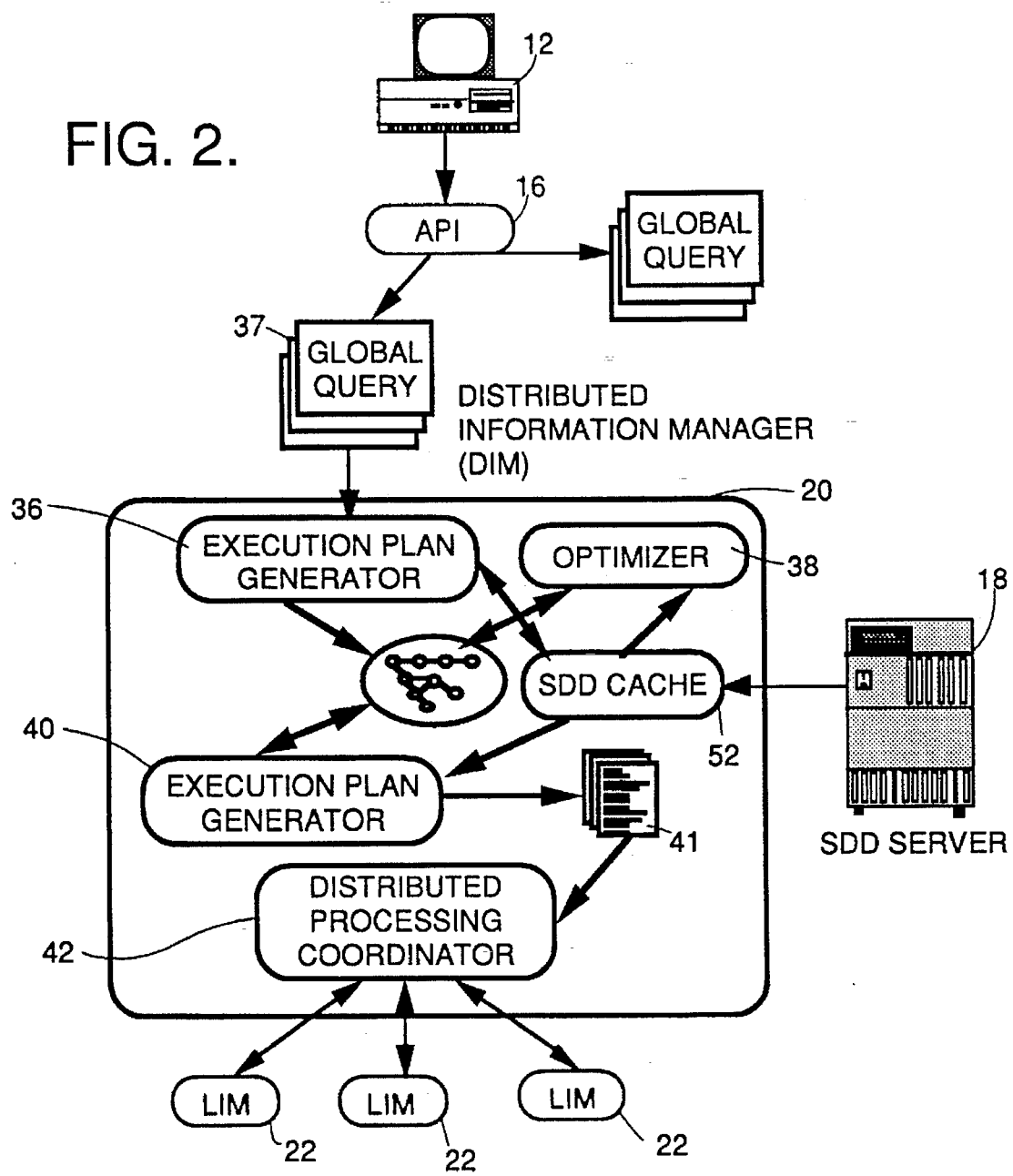
FIG. 2 is a diagram showing the component architecture and operational processing flow of a distributed information manager in accordance with the present invention.

FIG. 2 shows the DIM's lower level sub-components and the information that flows among them. The Syntactic and Semantic Parser (SSP) 36 parses and validates the syntax of the global query 37. The SPP interfaces with the Smart Data Dictionary (SDD) 18 to retrieve information about the Federated Semantic Schema (FSS) and Export Semantic Schema (ESS) from the underlying databases. The FSS and ESS represent the local schemata information, the unified view, and the inter-relationships among entities (views, objects) from multiple local schemata.

An Optimizer 38 provides careful planning to control the time that is required to process the global query for access to data in multiple databases. This is important in local DBMSs, but it becomes even more important when data must be moved across a network. The Optimizer 38 retrieves the data distribution information (i.e., fragmented, replicated, or mixed fragmented and replicated), the transmission cost, and the processing cost from the SDD 18. It then uses an Integrated Replicated Semi-join algorithm to plan for the overall execution. The general execution plan is composed of the following steps:

Local Reduction. Based upon the predicates specified in the global query, this step reduces the amount of data as much as possible before sending the data to other sites.

Fragment Replication. The Optimizer decides which fragments need to be replicated in order to minimize the overall query execution cost.

Local Query Execution. The portion of the local query that is involved with the replicate fragment is executed, and the intermediate result is sent to the home site. The home site is defaulted to the user's site, unless specified by the user.

Result Integration. The home site integrates the intermediate results sent by the local sites.

The Execution Plan Generator (EPG) 40 translates the local execution plan 41 for each of the enumerated sites from an internal data structure to the Distributed Intermediate structured Query Language (DISQL), an extension of SQL. For each of the enumerated local sites, the local execution plan is composed of three files containing SQL statements as well as schema and other data.

The local execution plan involves interfaces with the target DBMS. There are two major modes of coordination between DIM 20 and LIMs 22 for executing the local execution plan, namely autonomous and full-coordination mode.

In the autonomous mode, DIM 20 simply sends the enumerated LIMs 22 their local execution plans, which can be executed independently and in parallel. There is no coordination between DIM and LIMs in autonomous mode. Each LIM coordinates its own local execution plan, which includes interfaces with local DBMS and interaction with other LIMS.

In the full-coordination mode, the DIM coordinates all of the enumerated local execution plans by serializing each local execution step among LIMs. This means that no coordination is needed to be done at each LIM, because it only interacts with the DIM and not with other LIMs. Parallel processing of each LIM is inhibited in this cases, and the DIM becomes a bottleneck.

Intuitively, the autonomous mode provides better performance through parallelisms. But deadlock problems might occur during communication among LIMs, for fragment replication needed to be addressed. Deadlock problems can be resolved using either an operating system or a client/server's interrupt. In a long-haul network and large scale heterogeneous environment, using interrupts independently of the underlying operating systems is not currently available. For example, the Sybase Open Server does not support interrupts, it only provides the user with UNIX interrupts which are not usable for running LIMs in either operating system.

The present invention then uses an approach that employs a Distributed Processing Coordinator (DPC) 42 component in the DIM 20 to provide a semi-coordination mode which is based on the logic of each local execution step. This means that the autonomous mode is used only when no deadlock situation is expected, otherwise, the full coordination mode is employed.

Figure 3:
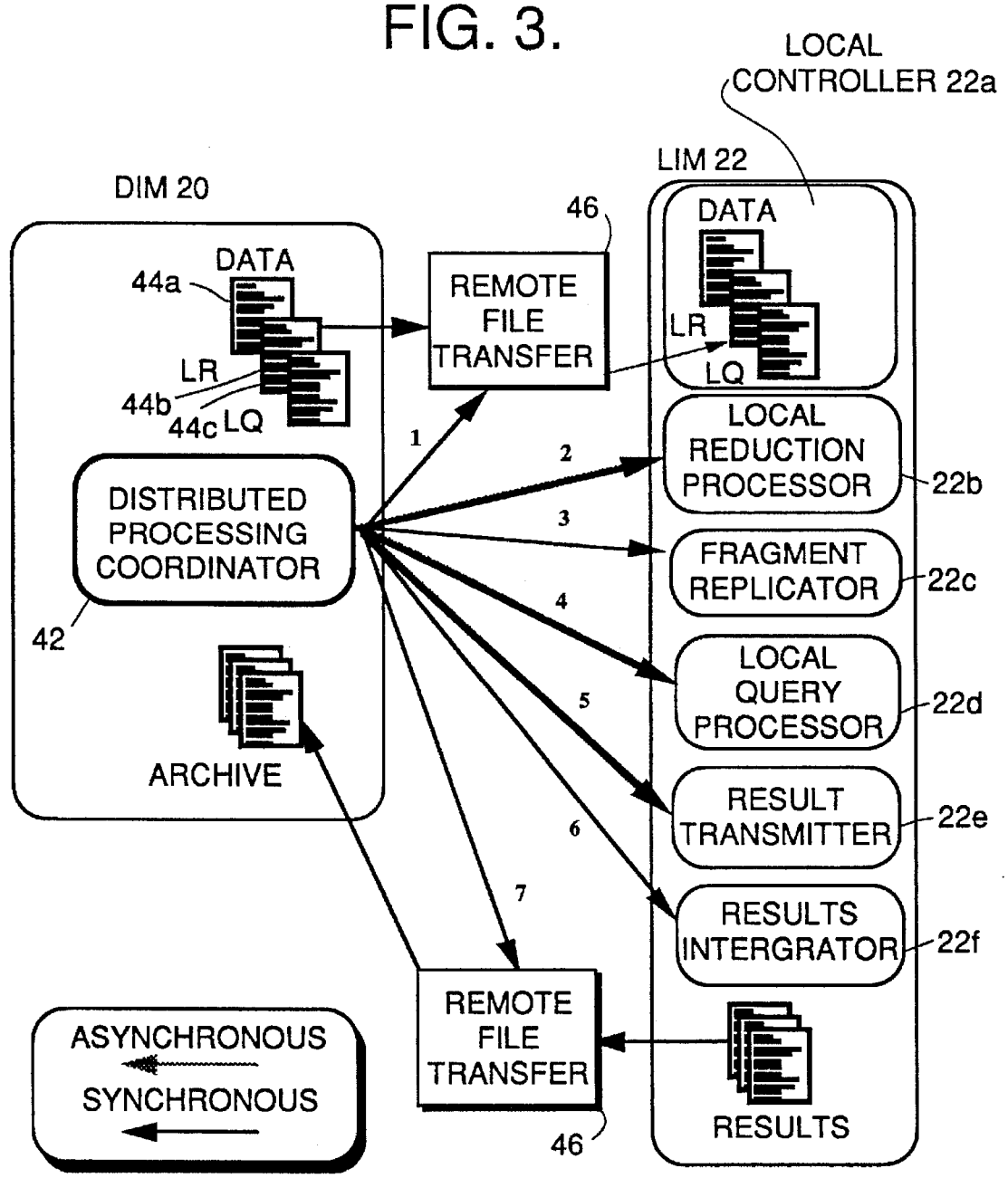
FIG. 3 is a diagram showing the component architecture and operational processing flow between a distributed information manager and an associated local information manager both in accordance with the present invention.
Figure 4:
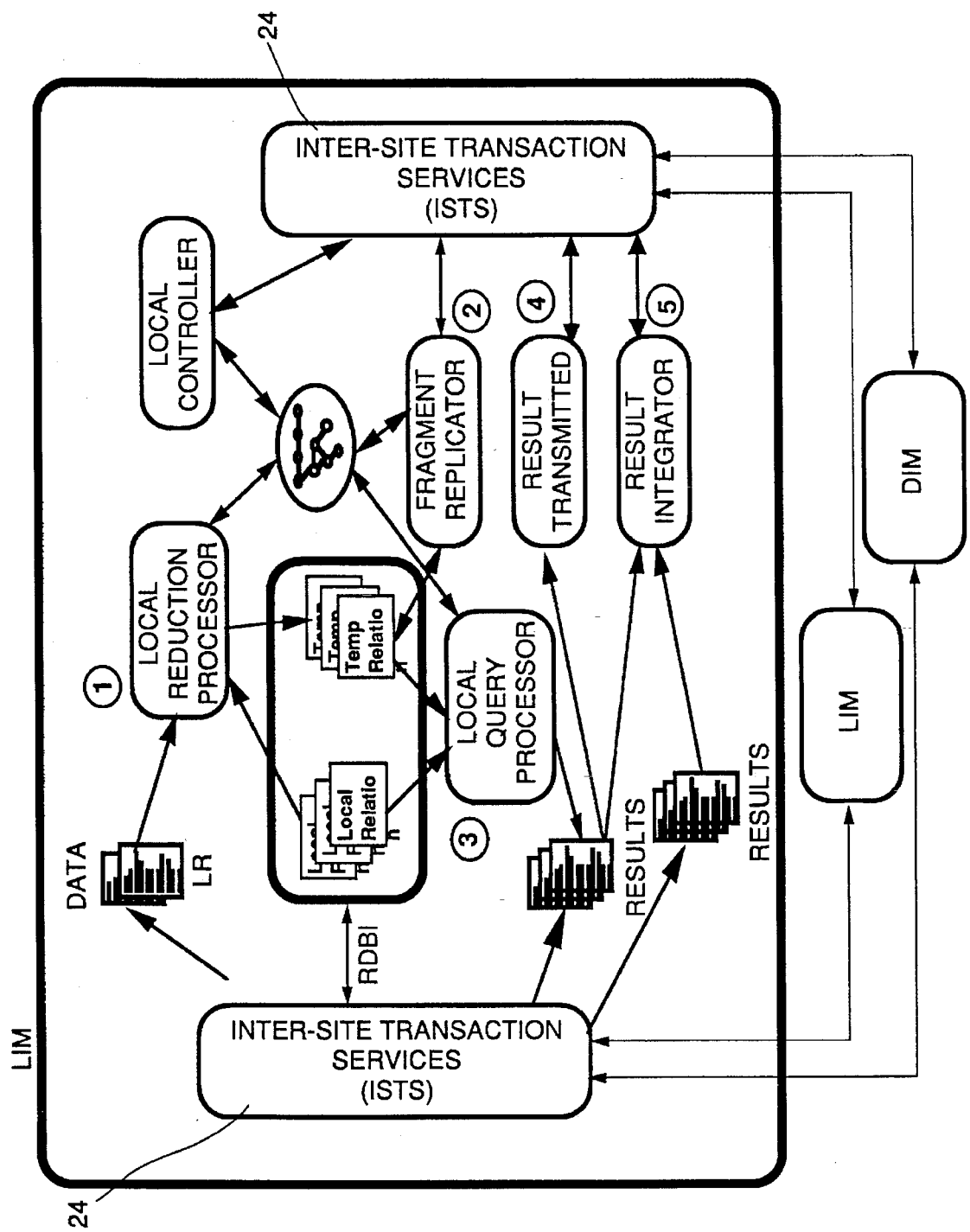
FIG. 4 is a diagram showing the component architecture and operational processing flow Of a limited information manager in accordance with the present invention.

The basic execution steps which are coordinated by DPC 42 in semi-coordination mode are described as follows in FIGS. 3 and 4:

The first step is to send each enumerated LIM 22 its local execution plan 41. The local execution plan is in the form of three files 44a–44c which are sent to each LIM 22 using the remote file transfer utility 46 provided by the Inter-Site Transaction Service (ISTS) 24. The first file 44A is a data file containing fragment and distribution information needed to execute the local query. The second file 44B contains SQL statements to reduce the local data, thereby simplifying the local query and minimizing the amount of data transmitted between LIMs. The third file 44C contains the local query to be executed. The local query itself includes the data field names and values provided by the SDD, input filter and input translator.

The second step is to send each enumerated LIM 22 a request to execute its local reduction queries. Since there is no interaction between LIMs during local reduction, this step is done asynchronously allowing the LIMs to execute in parallel.

The third step is to send each enumerated LIM a request to replicate relevant fragments. The information as to what fragments need to be replicated is contained in the data file 44A sent to the LIM 22 during Step 1 above. This step is done sequentially so that only one LIM is doing fragment replication at any time. This will prevent deadlock situations by ensuring that all other LIMS will be available as servers to receive the fragment data. Depending on the timing, it is possible for a LIM to still be executing its local reduction plan when another LIM attempts to send it fragment data. In that case, the LIM sending the fragment data is guaranteed to have to wait only a limited amount of time before its request is serviced.

The fourth step is to request that each enumerated LIM 22 execute its local query to search and retrieve the data from its associated DBMS in accordance with the data field names and values in the local query. This step is executed asynchronously is allowing parallel execution of multiple LIMS.

The fifth step is to send each enumerated LIM 22, except the home site, a request to send its intermediate result from step four above, to the home site. This step is executed synchronously to guarantee that the home site has received all the intermediate results.

The sixth step is to send a request to the home site to combine the intermediate results received from other sites with its own intermediate results, and to send the final result back to the DIM 20. This step is also done synchronously to prevent waiting global query requests at the DIM from executing before the results are received, thereby causing a deadlock situation.

As a seventh and final step, the DPC 42 archives the results and associates them with their schema and index for later retrieval by the application. The output translator converts the results to the uniform i/o format and returns them to the DIM, which integrates the results and presents them to the requesting user.

The Local Information Manager (LIM) 22 executes and monitors the local execution plan and interfaces with foreign DBMS for data retrieval. The specific LIM architecture will now be discussed.

For each DataBase Management System (DBMS), a LIM 22 is required to provide the mapping from the global view to the local view, the translation from DISQL to the target DBMS language, and the interface to the target DBMS. The sub-components of the LIM are: the Local Controller; the Local Reduction Processor; the Subquery Processor; the Result Integrator; the Relation Replicator; and, the Relational DBMS Interface. The LIM's preferred modular architecture facilitates the building of the new LIMs. For example, common features of relational databases such as join", "projection" and "selection" are modularized into appropriate modules which can be shared between the LIM for each otherwise incompatible database.

The Local Controller (LC) 22A controls the execution is of the local plan sent by the DIM 20 by coordinating operations of the other LIMs' components. As mentioned above, this can be done synchronously or asynchronously. In both modes, exactly the same components are used except that the timing of execution in synchronous mode is controlled by the DIM 20. A local execution plan 41 is broken into five discrete steps; local reduction; fragment replication; local execution; result transmission; and, result integration.

The last two steps are mutually exclusive since the home site performs result integration, but it never needs to transmit the results. In synchronous mode, each step is executed directly from the DIM through the ISTS; while, in asynchronous mode, all the steps are executed by the LC 22A through ISTS, but no coordination is needed by DIM.

The Local Reduction Processor (LRP) 22B is responsible for executing the SQL statements in the local reduction file received from the DIM 20. Before starting execution, the LIM's internal data structures must be initialized with the information obtained from the data file received from DIM 20. At this point, the LIM is initialized with the required information for the entire local plan, rather than just with the local reduction step. This information includes such items as: result fragments; local fragments; and, replicated fragments which will be used during execution and the schema for those fragments. Information in the data file also determines the sites destination for sending the intermediate results and fragments during replicated steps 3 and 5. The LIM also accesses the SDD 18 to retrieve meta-data about the schema of all local relations used in the local plan. Once the above initialization is completed, the LRP 22B executes each of the SQL statements contained in the local reduction file. These SQL statements are typically either "create" or "select" statements. "Create" statements are used to create a temporary relation to hold fragments received from Other LIMS. "Select" statements are used to reduce data of local relations before replicating them to other sites.

Figure 5:
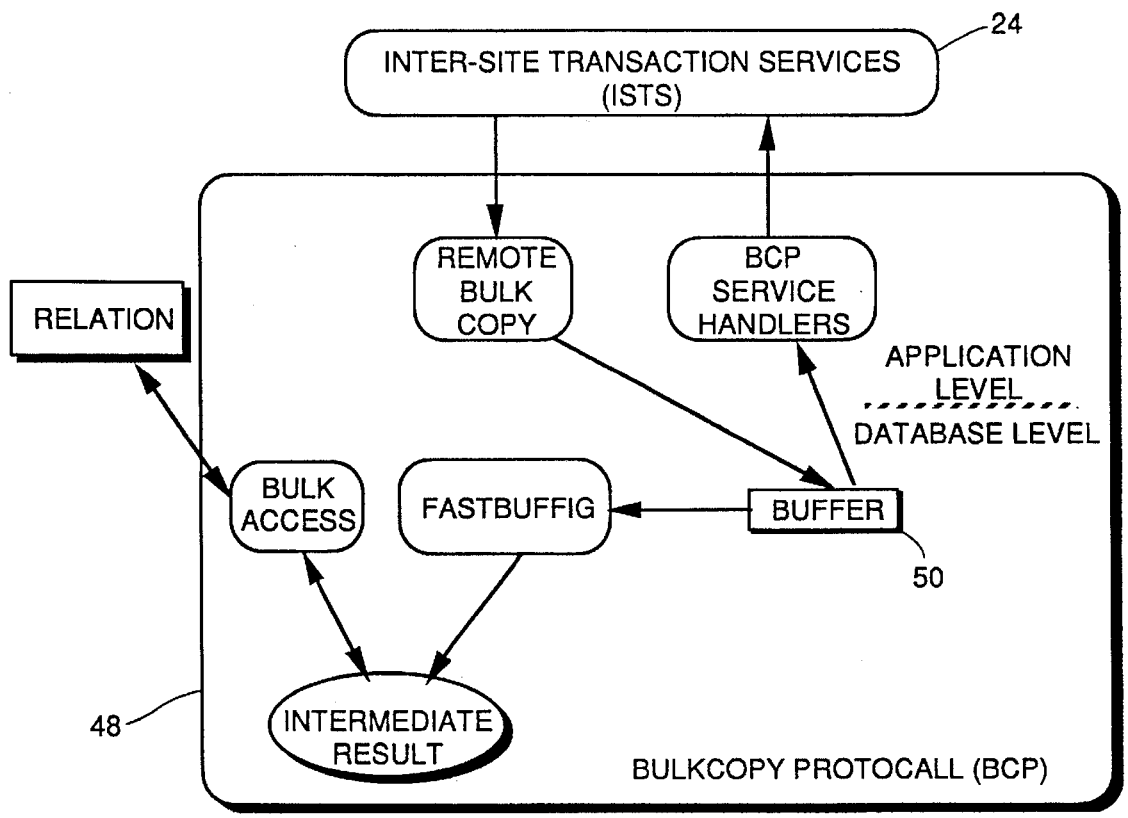
FIG. 5 is a diagram showing a Bulk-Load Copy Protocol (BCP) in accordance with the present invention.

The Fragment Replicator (FR) 22C uses one ISTS, a Bulk-load Copy Protocol (BCP) 48, for efficiently replicating fragmented relations between LIMs. As shown in FIG. 5, the BCP 48 can be further broken into an application layer which is RDBMS independent, and a lower database layer which is actually part of the Relational DataBase interface.

The BCP 48 is preferably implemented with two goals in mind: portability across RDBMSs and performance efficiency. Portability is achieved since the application layer is reusable across all LIMs. Unfortunately, the database layer needs to be customized for each DBMS. Efficiency is improved by requiring only one access to each relation being replicated regardless of the number of recipients. This is achieved by transmitting the relation data to each recipient as it is retrieved from the database. Efficiency is further improved by allowing the database layer to be customized, thereby taking advantage of any special bulkload transfer facilities supported by the underlying RDBMS. For example, in Sybase, the most efficient method of getting data both in and out of a relation is to use the "bulkload" utilities. While in Oracle, the most efficient way to got data out of a relation is to use an SQL query and array bindings. The most efficient way to insert the data into Oracle is to use the SQLLoader utility.

The application layer of the BCP 48 interacts with the database layer through an ASCII buffer 50 which allows it to be independent of the method used to retrieve the data. A set of buffering utilities convert data from the representation used in the output (e.g., row of data in to in memory in Oracle) to ASCII, and from ASCII to the representation used for input (e.g., sqlloader data file in Oracle). The actual data sent across the network contains relation schema and other information such as: number of rows; size of data, etc.

After the above local reduction and replicated fragments steps, all relevant fragments are copied and stored in temporary relations at designated sites. The Local Query Processor (LQP) 22D is responsible for executing queries in the local query file received from the DIM 20. Before executing these queries, the LQP 22D must combine all fragments of the same relation (those retrieved locally and those replicated from other LIMS). The LQP 22D generates the appropriate SQL statements needed to combine the fragments and executes them using the RDBI. After the fragments are combined, the local query is executed using the RDBI, and the intermediate results are stored in a file.

The Result Transmitter (RT) 22E component simply uses the remote file transfer (RFT) protocol provided by the ISTS 24 to transfer the file containing the above intermediate results to the home site.

The Result Integrator (RI) 22F combines all the intermediate results received from other LIMS (via their result transmitters) with its own intermediate results output by its Local Query Processor 22D. It will then return the combined results to the DIM 20. In asynchronous mode, the combined results are returned to the DIM 20 as a separate step in which the DIM 20 becomes a server, and the LIM 22 becomes a client. As previously discussed, this can potentially cause a deadlock situation to occur, since the DIM 20 may start the execution of another query before it has received the results of the previous query. This is acceptable if the DIM 20 can be interrupted, otherwise the LIM 22 will be waiting to transmit its combined results while the DIM 20 is waiting to execute the next query at the same LIM 22, thus causing a deadlock. Synchronous mode operation avoids this problem by returning tho combined results to the DIM 20 as a response to the combine result request. In this way, the DIM 20 cannot start the execution of another query until result integration is complete at the home site, and the combined results are returned to the DIM 20.

At this juncture, it should be understood that the present invention also includes architecture where at least one LIM under a DIM is also a DIM, so that the same architecture is recursively replicated with the second DIM acting as a LIM to its overlying DIM and as a DIM to its underlying LIMs. In other words, the same architecture being described herein between a DIM and a series of LIM may be replicated in a recursive manner by replacing at least one of the underlying LIMs with a DIM and continuing the replication as needed to group LIMs into a logical or physical responding unit.

The Smart Data Dictionary (SDD) Server 18 contains information such as: schema; data distribution; sites configuration; domain knowledge; and, inter-site relationships. The SDD 18 itself is a database containing meta-data that can be used to support the DIM 20 and the LIM 22 in processing the queries. SDD data storage may be accomplished by a UNIX file system or an Object-Oriented DataBase Management System (OODBMS) such as ITASCA.

The SDD server 18 supports requests to access the SDD's meta-data stored in a UNIX file system from a remote site. DIM 20 and LIM 22 may access the SDD server 18 remotely to retrieve meta-data for parsing, translating, optimizing, and coordinating the global and local queries. In FIG. 1, the SDD server 18 acts as a replacement for the knowledge-based manager for SDD that stores in a UNIX file system.

Figure 6:
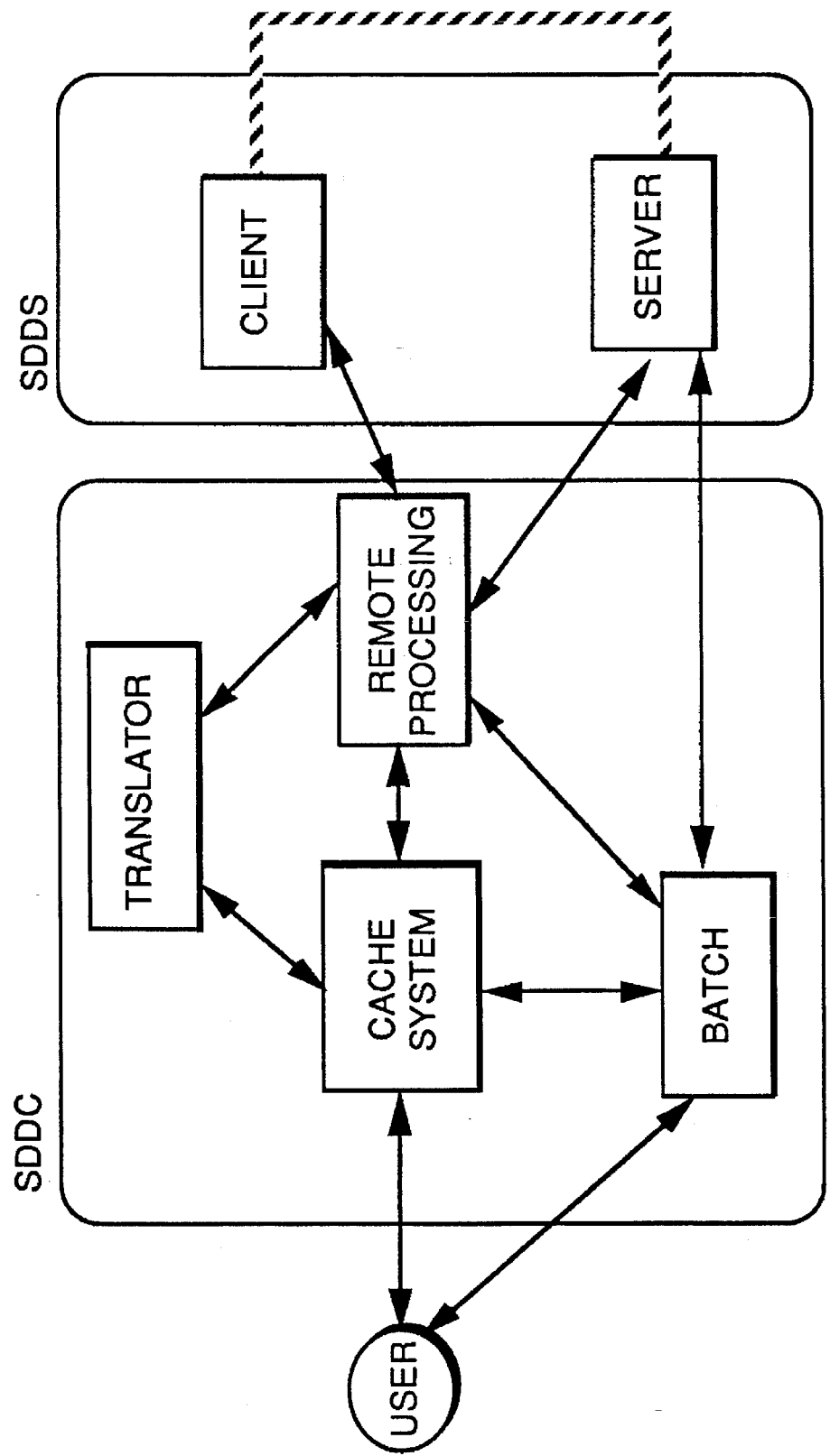
FIG. 6 is a diagram slowing the component architecture and operational processing flow between a Smart Data Dictionary Cache Memory Management and a Smart Data Dictionary Server in accordance with the present invention.

The SDD contains meta-data such as: data distribution information, schema description, and FIM system configuration. The DIM uses the schema and data distribution to generate the execution plans. The LIM uses the schema to perform local queries and map local queries to other sites. Caching the meta-data at the processing site will greatly reduce the communication and accessing cost. For example, using Cache Memory Management (CMM) 52, DIM 20 can access and cache the relevant data which might be used by the next query. This will eliminate unnecessary communication with the SDD 18 for retrieving the schema. Each LIM 22, DIM 20, and SDD server 18 uses the same CMM. FIG. 6 illustrates the CMM and the SDD server architecture.

Specifically, all access to the SDD schema is done through the CMM which holds in memory the schema for the most recently used relations. If the data is not in the cache memory, CMM transparently retrieves the relation locally (i.e., from a file or DBMS) or from another remote server, or both. Requests to the cache can either be for specific relations (such as relation name, field ID, number of fragments, etc.) or for entire schema. For efficiency reasons, the DIM and LIMs usually load the schema for all relations used in a query during the initialization hierarchy representing a sub-tree from the global view starting at a specific level. The cache may use a linear search to access information, and be built using a modular architecture which allows easy replacement of the algorithms to search the cache and selectively swap out candidates with more elaborate ones. The time of last use, the time brought into cache, and the number of times accessed are maintained for each cache entry to support such algorithms. The amount of memory used by the cache is a function of the number of relations it is holding. However, the maximum number of relations which it can hold must be specified when initializing the cache.

The SDD server has two Distributed Transaction Services (ISTS): "send catalog" and "send schema" to support the operation of the SDD cache memory management. The "send catalog" service sends the client a copy of the relation catalog. The catalog contains a list of relations, each associated with an access type, and a server name. If a schema is not in cache memory, the access type determines how to retrieve the data such as from a local file, from a local RDBMS, or from another server. While the catalog may be retrieved prior to the execution of the first access to the cache, it is preferred that it be broadcast to all processes upon start up. The catalog will preferably be maintained so that it is consistent on all sites at the same time. The "send catalog" service is a special memory to memory transfer between the server and the client.

The "send schema" service accepts requests for multiple relations at different levels in the hierarchy. The SDD server contains the same cache as other client/servers. Meta-data will be first searched using the cache memory. If the meta-data is not found in cache, CMM connects to the server associated with the meta-data in the catalog, and retrieves the requested meta-data. The server can reside locally or remotely. CMM modular architecture provides the capability to adapt to different storage management such as: OODBMS, relation, file and knowledge base management.

Figure 7:
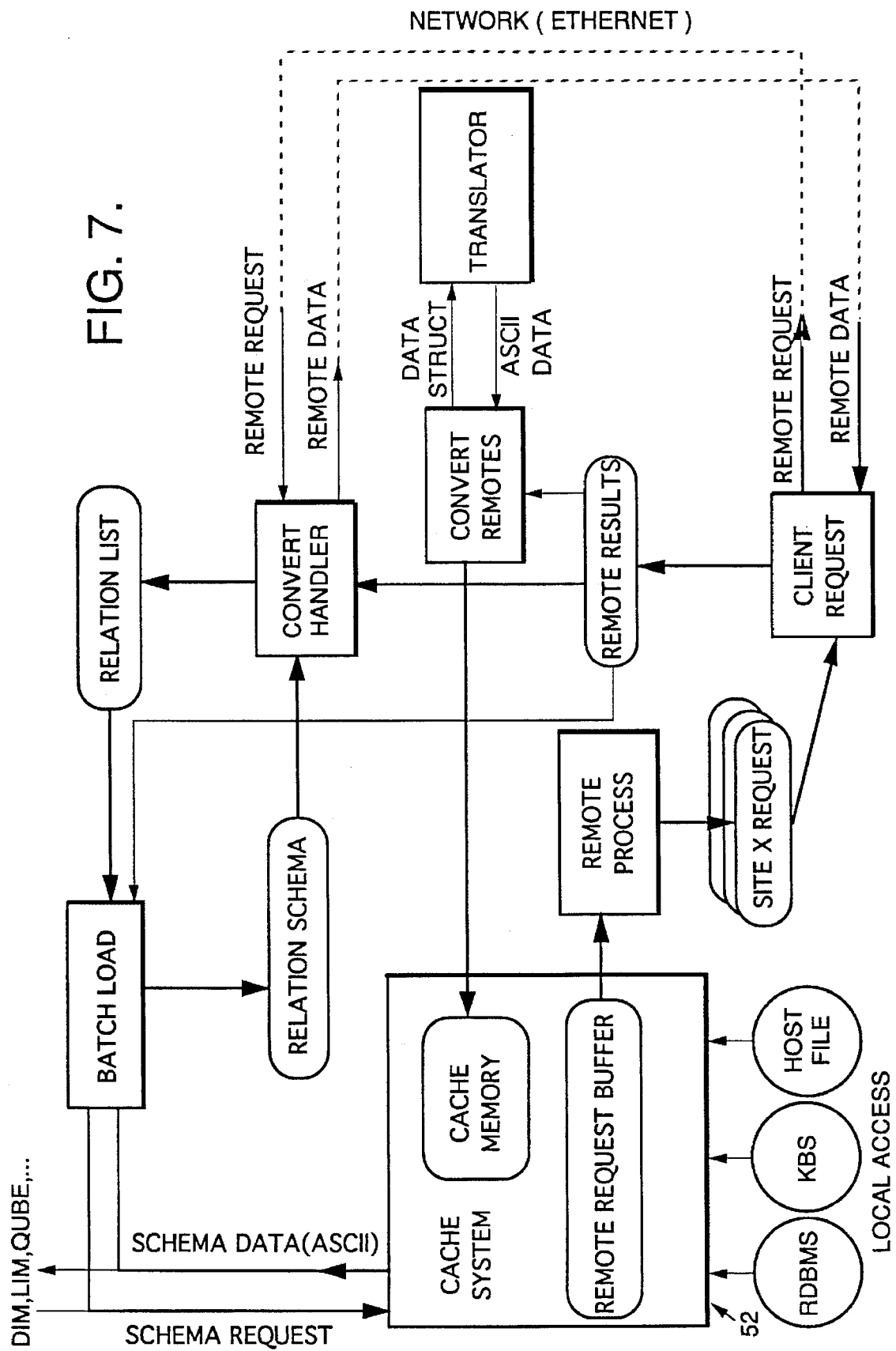
FIG. 7 is a diagram showing the component architecture and operational processing flow of a Cache Memory Management device in accordance with the present invention.

FIG. 7 shows the interactions between various components of CMM 52 and the server. The bulk of SDD server requests will be for schema access for which most of the work will be done by the local access methods of the cache in a transparent way to the service handler.

The Inter-Site Transaction Service (ISTS) 24 provides the inter-connection among sites. A set of distributed transaction services are provided to support the distributed access, local access plans, execution, and SDD meta-data access. The Distributed Processing Coordinator (DPC), local controller (LC), and CMM (Cache Memory Management) components use ISTS to support inter-process communications.

Specifically, ISTS 24 supports the inter-connection among different components: DIM 20; LIMs 22; and the SDD server 18 which may reside at different sites and communicating through different network protocols such as to TCP/IP, XN25 etc. A set of Inter-site Transaction Services 24 using the Sybase Client/Open Server is preferably developed to support this communication.

Figure 8:
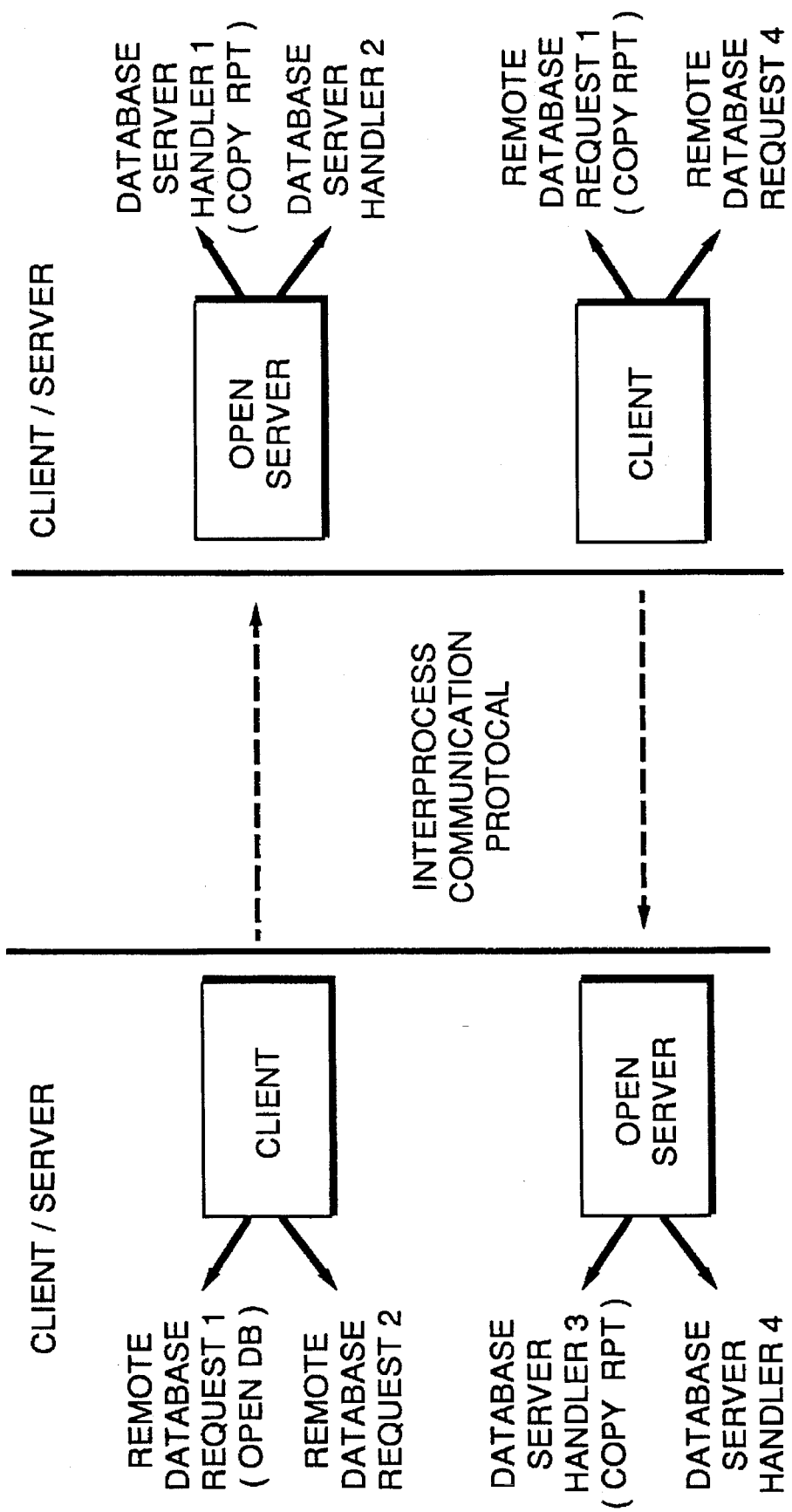
FIG. 8 is a diagram showing a Client/Server Model in accordance with the present invention.

The Sybase Client/Open Server software provides the transparency of low level network protocols and manages resources of each connection. The Sybase Client/Open Server consists of Open Client, a programmable library interface for use by client applications, and the Sybase Open Server for use by servers of any type. These two interfaces offer a functionally rich set of library routines. It provides the necessary toolkit to implement transparent client/server communications between different database products such as Oracle and Ingres, and between non-database Servers, e.g., UNIX files system, on heterogeneous computers and networks. The interfaces can run on separate processors and platforms, communicating through a variety of Local Area Networks (LAN) transport protocols (TCP/IP, XN25, etc.), or run together on a single processor as shown in FIG. 8. Network support is built into the products. The Open Server's multi-thread architecture delivers high performance as a shared database server.

It is preferred that the distributed processing architecture of the ISTS contain at least two major communication topologies: Hierarchical Distributed Processing Topology (HDPT) and Hierarchical Start Distributed Processing Topology (HSDPT) for connecting the Query Browser and Editor (QuBE); Knowledge Base Manager (KBM) or SDD server; DIM; and LIMs components.

Figure 9:
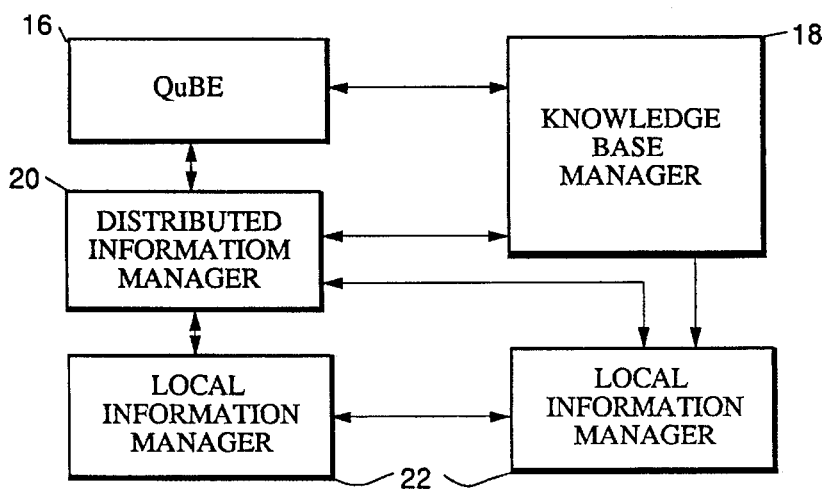
FIG. 9 is a diagram showing a Hierarchial Star Distributed Processing Topology in accordance with the present invention.
Figure 10:
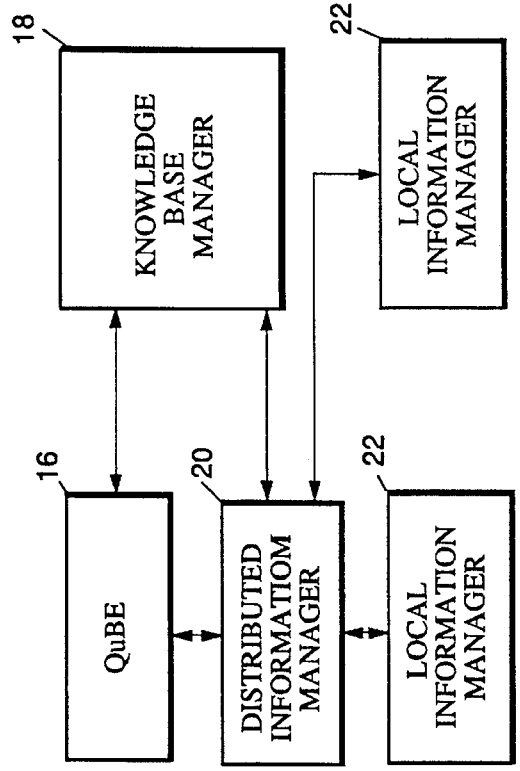
FIG. 10 is a diagram showing a Hierarchial Distributed Processing Topology in accordance with the present invention; and, FIG. 11 is a diagram showing a Distributed Transaction Service Hierarchy Topology in accordance with the present invention.

The Hierarchical Distributed Processing Topology (HDPT) is an abstract model shown in FIG. 9 used to support the distributed query processing of the present invention. This model improves the reliability and reduces the extent of communication and processing bottlenecks at the cost of inter-site communication and the complexity of the LIM. If the communication cost is negligible, then the HDPT described in FIG. 10 is more suitable.

In the Hierarchical Start Distributed Processing Topology (HSDPT) illustrated in FIG. 9, there is no communication among the LIMs 22, and all the coordination is done at the DIM 20. This topology simplifies the LIM development, and there is no cost of inter-communication among the LIMs. The DIM becomes a bottleneck and is very vulnerable to failure. In general, the decision of choosing one topology over the other topology depends on the specific application environment.

Figure 11:
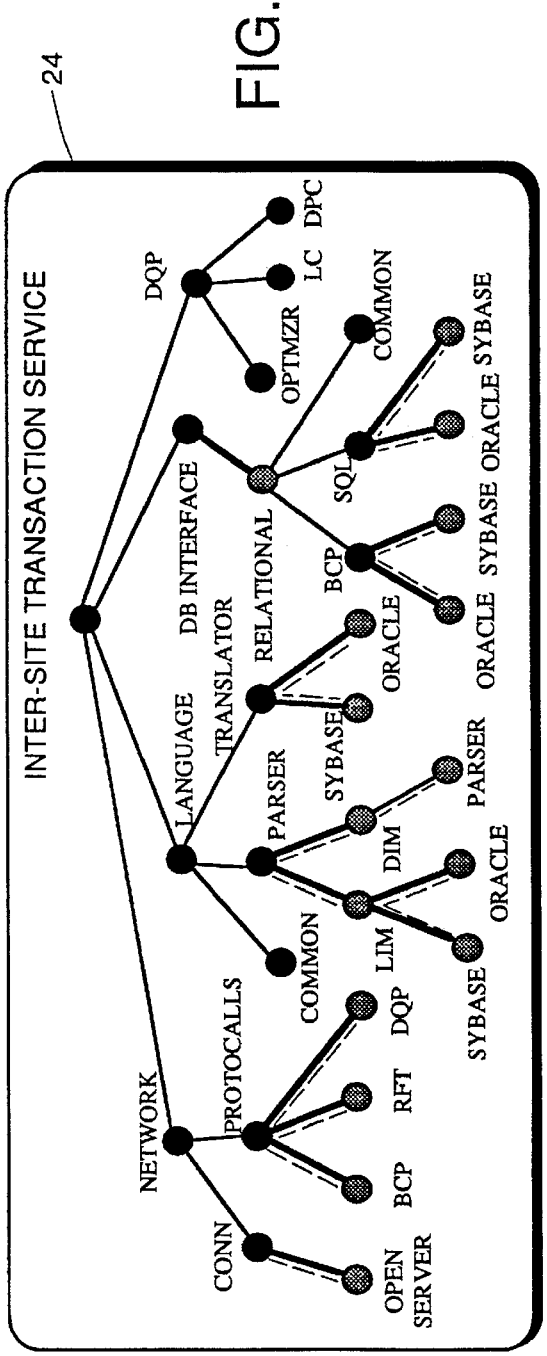

The present invention takes advantage of the Sybase Open Server features to support the client-to-server, server-to-server, and server-to-client communications in a heterogeneous environment among DIM, LIMs, KSM and QuBE. Each ISTS 24, as illustrated in FIG. 11, consists of a pair of Client Request and Server Service. The ISTS fits into the Application Layer of the standard OSI protocols, and consists of three sub-layers:

(a) Application Interface Layer: provides the high level interface to any application that requires the inter-process communication. Routines at this level are usually independent of the specific hardware and software and are therefore reusable across applications;

(b) Distributed Transaction layer: supports the necessary services for distributed databases. Routines at this level are usually hardware and/or software specific, and may therefore need to be modified when interfacing with different DBMSs or operating systems;

(c) Network Communications Layer; is the layer that provides the logical/physical connection and inter-connection among sites. The Sybase Client/Open Server may be used at this level.

The ISTS can be organized in a hierarchy as shown in FIG. 11 which encodes both a class hierarchy and a composition hierarchy. Dotted lines represent a "type-of" relation between services, while solid black lines represent a "Part-of" relation between services. For example, a language interface which has three main components; a parser, a translator, and common utilities which are "part-of" but not a sub-class of a language interface. On the other hand, the Oracle and Sybase translators are a "type-of", or sub-class of language translators.

It is preferred that the major ISTS groups include;

(1) A Network Interface that provides connectivity plus high level protocols such as remote file transfer, remote bulk copy, meta-data processing and distributed query processing. The Connectivity services are at the DTS level and support connections and communications to other server/clients. In the preferred embodiment, the connectivity services are built on top of the Sybase open client/server libraries and provide the network building blocks for most other services. Protocols are at the application level and use connectivity services as well as other services from the hierarchy. For example, the BCP protocol in the network interface uses the BCP utilities part of the relational database interface.

(2) A Language Interface that provides for the mapping from one language to another such as from DISQL to Sybase SQL or Oracle SQL. Some common operations can be shared between language interfaces, but most likely it is preferred that each will require a separate parser and translator.

(3) A Database Interface that provides access to the underlying database supporting such operations as connection, query execution (open, parse, execute), and result retrieval (bind, next row). The interface also provides bulk access methods (in, out, buffer) if they exist.

(4) A Distributed Query Processing Interface that provides the services needed to support the DIM (optimizer) and the operation of the Distributed Processing Controller and the Local Controller (distributed query execute, local query execute, local reduction, etc.).

The ISTS layer architecture supports an open and modular implementation for interoperability of heterogeneous information management systems. It takes advantages of third party software. Changes to one layer will not affect other layers. For example, if one communication package were replaced for another, other layers implementation remain intact.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

We claim:

1. A database controller for integrating data from a plurality of interconnected local databases to provide users with access to a virtual database, comprising:

a user interface for generating a global query to search said virtual data base, which has an associated global format, said global query including at least one data field from a set of commonly used data fields whose values are represented in an input format;

a smart data dictionary (SDD) that contains configuration data for each of said local databases including respective local formats for each of said commonly used data fields;

a selector for selecting the input format for generating the global query from one of said global and local formats;

an input translator that converts the value of said data field in said global query into local values in the respective local formats;

a data information manager (DIM) that generates local queries including said local values for said data field in response to said global query and in accordance with the respective configuration data;

a plurality of local information managers (LIMs) that execute the local queries to search for and retrieve from the respective local databases data that is associated with the local values of said data field, said LIMs passing the data back to the DIM where it is combined to present the requesting user with an integrated response; and an output translator that converts the data passed back from said LIMs from their respective local formats into said input format so that the data can be combined to present the user with the integrated response.

2. A database controller for integrating data from a plurality of interconnected local databases to provide users with access to a virtual database, comprising:

a plurality of local databases at different remote locations, said local databases including different subsets of data fields from a set of commonly used data fields, in which a particular data field in said set has heterogeneous local formats in said local databases;

a network for interconnecting the remotely located local databases;

a user interface for generating a global query to search the interconnected local databases using a single global schema that defines a virtual database, said global query including at least one data field from the set of commonly used data fields whose values are represented in an input format;

a centralized database that interacts with the local databases over the network to retrieve data related to the value of the data field in the global query, comprising:

a smart data dictionary (SDD) that contains configuration data for each of said local databases and said global schema, said configuration data including respective local formats for each of said commonly used data fields;

a filter that enumerates the local databases that contain data related to the value of the data field in the global query to improve the efficiency of the search of the virtual database;

an input translator that converts the value of said data field in said global query into local values in the respective local formats for the enumerated local databases to facilitate a complete search of the virtual database;

a data information manager (DIM) that generates local queries including said data field's local values, for the enumerated local databases in response to said global query and in accordance with the respective configuration data, transmits the local queries to the enumerated local databases, and receives data in response to the local queries in their respective local formats; and an output translator that converts the data passed back by the local databases from their respective local formats into said input format, said DIM combining said data into am integrated response in said local format and transmitting the response back to the requesting user; and a plurality of local information managers (LIMs) at the respective local databases that interact with the centralized database in accordance with the global schema to execute the local queries to search for and retrieve from the respective local databases data that is associated with the local values of said data field, said LIMs passing the data back to the centralized database over the network where the data is translated into the input format and combined to present the requesting user with an integrated response.

3. The database controller of claim 2, wherein said filter is a database that, for each of the data fields in said set and for each of the values, represented in a global format, associated with each of those fields, enumerates a list of the local databases which contain the respective local values, said input translator comprising:

a global translator that converts the value of the data field in said global query into said global format, said filter thereafter selecting the list that corresponds to that value; and a local translator that converts the value of the data field from said global format into the local values in their respective local formats for the local databases enumerated in the selected list, said DIM generating said local queries for the enumerated databases.

4. The database controller of claim 2, wherein said data fields in said set each have a name which can vary between the local and global formats, said input translator also converting the name of the data field in said global query into the local names for each of said local databases.

5. A database controller for integrating data from a network of interconnected local databases to provide users with access to a virtual database, comprising:

a smart data dictionary (SDD) containing data representing schema, data distribution, local site configuration and inter-site relationships of data among the local databases for each of said local databases and a single global schema that defines a virtual database, said local site configurations including respective local formats and a global format for each data field in a set of commonly used data fields, said SDD maintaining data consistency of the existing local databases and global schema as new local databases are added to the network;

a user interface for selecting an i/o format from among said local and global formats and for generating a global query to search said virtual data base, said global query including at least one data field from said set of commonly used data fields whose values are represented in the selected i/o format;

a global translator that converts the value of said data field in said global query into a global value in the global format;

a global filter that enumerates the local databases that contain data related to the global value;

a local translator that converts the global value into local values in their local formats for the enumerated local databases, respectively;

a data information manager (DIM) that generates local queries, which include said local values, for the enumerated local databases in response to said global query and in accordance with the SDD data;

a plurality of local information managers (LIMs) that execute the local queries to search for and retrieve from the enumerated local databases data that is associated with the local values of said data field, each of said LIMs being further adapted to generate, in accord with the data contained in said SDD, a data retrieval request for execution by another LIM and for receiving data from that local database; and an output translator that converts the retrieved data from the local formats into the selected i/o format and passes the data back to the DIM where it is combined to present the requesting user with an integrated response.

6. The database controller of claim 5, wherein said data fields in said set each have a name which can vary between the local and global formats, said global translator also converting the name of the data field in said global query into a global name and said local translator converting the global name into local names for each of the enumerated local databases.

7. The database controller of claim 5, wherein said global translator, said filter and said local translator together comprise:

a centralized translation-filtration database which includes:
a) a global look-up-table (LUT) that maps values from any of said local formats into said global format;
b) a filter LUT that provides an enumerated list of local databases that contain information in response to values in said global format; and
c) a local LUT that maps the value from said global format into the local values in their respective local formats for said enumerated local databases.

8. In a computer data network having a plurality of interconnected local databases with a plurality of users each capable of generating a global query for accessing and retrieving data from said databases in accord with a single query protocol, said global query including at least one data field from a set of commonly used data fields, a database controller for directing the transmission of the user generated global query to individual ones of the local databases and for receiving and integrating the requested data received from the databases into a single response and for transmitting the integrated single response to the requesting user, said database controller comprising:

a central database comprising:
a smart data dictionary (SDD) containing a database of data representing schema, data distribution, local site configuration and inter-site relationships of data among the local databases in the network for each database in the network that together define a single global schema for accessing a virtual database;

a filter that enumerates the local databases having data responsive to the global query in accord with said data field and the data contained in the SDD;

an input translator that converts the data field in the global query into local data fields compatible with the enumerated local databases in accord with the local site configuration in the SDD; and a data information manager (DIM) communicating both with said SDD to retrieve data therefrom, and with said user to receive said global query therefrom and to transmit responsive data thereto, for decomposing the global data query into a local-site execution plan that includes said local data fields for retrieval of data from the enumerated local databases, and for transmitting that portion of said local-site execution plan to be executed to the appropriate database for execution, and receiving data therefrom responsive to said local-site execution plan and said local data field;

a plurality of local information managers (LIMs), each communicating with said DIM and said SDD, for controlling data flow to and from a specified database in the network in response to that portion of said local-site execution plan received from said DIM and for transmitting retrieved data responsive to that portion of said local-site execution plan to said DIM, each of said LIMs further adapted for generating, in accord with the data contained in said SDD, a data retrieval request for execution by another LIM and for receiving data therefrom in response thereto, in order to complete that portion of said local-site execution plan received by it for execution; and an output translator in said central database that converts the data received from each of the LIMs in accord with its local site configuration to a single site configuration, said DIM combining said data into an integrated single response and transmitting it back to the requesting user.

9. The database controller of claim 8, further comprising:

at least one LIM controlling data flow to and from at least two local databases and adapted to decompose that portion of said local site execution plan received from said data information manager means into a sub-local site execution plan for retrieval of data responsive to that portion of said local site execution plan received from said DIM from each of said controlled local databases.

10. The database controller of claim 8, wherein said DIM comprises:

a syntactic and semantic parser interfacing with said SDD for retrieving data representing local schema information and the interrelationships among data, and for parsing and validating the syntax of the global query using such data retrieved from said SDD.

11. The database controller of claim 8, wherein said DIM comprises:

an optimizer interfacing with said SDD for retrieving data representing local schema information and the interrelationships among data, and for reducing the amount of data needed to be transferred among local site databases and for choosing the appropriate local database for processing each portion of the local site execution plan.

12. The database controller of claim 8, wherein said DIM comprises:

a local site execution plan controller interfacing with each of said local databases to send each of them that portion of said local site execution plan necessary to extract responsive data from each said local database.

13. The database controller of claim 8, wherein said LIM further includes:

a local controller for controlling the execution of that portion of the local site execution plan sent by the DIM by coordinating all internal operations.

14. A method for integrating data for a plurality of interconnected local databases to provide users with access to a virtual database, comprising:

a) providing meta-data information for each of a plurality of local databases and a virtual database in a central location, said meta-data information including respective local and global formats for each data field in a set of commonly used data fields;

b) generating a global query to search said virtual database, said global query including at least one data field from said set of commonly used data fields whose values are represented in an i/o format;

c) filtering said global query to enumerate those local databases that contain data related to said date field in accord with the meta-data information;

d) translating the value of said date field in said global query into local values in the respective local formats in accord with the meta-data information for the enumerated local databases;

e) generating local queries for the enumerated local databases that include the respective local values in accordance with the meta-data information;

f) passing the local queries to the respective local databases;

g) executing the local queries to search for and retrieve from the local databases data that is associated with the local values of said data field;

h) translating the data retrieved from the local databases from their respective local formats into said i/o format; and i) integrating said data to present the requesting user with an integrated response.

15. The method of claim 14, further comprising:

j) selecting said i/o format from among said local and global formats.

16. A virtual database, comprising:

a plurality of local databases at different remote locations, said local databases including data fields, in which a particular data field has heterogeneous local formats in said local databases and a particular value for a data field is stored in a subset of the local databases;

a network for interconnecting the remotely located local databases;

a user interface for generating a global query to search a virtual database, said global query including at least one data field from a set of commonly used data fields whose values are represented in an input format;

a centralized database that interacts with and searches via the network the local databases that contain data related to the value of the data field in the global query, said database comprising:

a smart data dictionary (SDD) containing meta-data including schema, data distribution, local site configuration and inter-site relationships of data among the local databases in the network for each local database and a single global schema that defines a virtual database, said local site configuration including respective local formats for each of said commonly used data fields, said SDD maintaining data consistency of the existing local databases and global schema as new local databases are added to the network;

a filter that enumerates the local databases having data responsive to the global query in accord with the value of said data field and the meta-data contained in the SDD;

an input translator that converts the value of said data field into local values in the respective local formats for the enumerated local databases in accord with the meta-data contained in the SDD; and a data information manager (DIM) that generates local queries, including said data field's local values, for the enumerated local databases in response to said global query and in accordance with the SDD data, transmits the local queries to the enumerated local databases, and receives data in response to the local queries in their respective local formats; and an output translator that converts the data passed back by the local databases from their respective local formats into said input format, said DIM combining said data into an integrated response in said input format and transmitting the response back to the requesting user; and a plurality of local information managers (LIMs) at the respective local databases that execute the local queries to search for and retrieve from the respective local databases data that is associated with the local values of said data field, each of said LIMs further adapted for generating, in accord with the data contained in said SDD, a data retrieval request for execution by another LIM and for receiving data therefrom in response thereto, to complete the execution of its local query said LIMs passing the data back to the centralized database over the network where the data is translated into the input format and combined to present the requesting user with an integrated response.

* * * * *